United States Patent
Susca et al.

(10) Patent No.: US 12,228,151 B2
(45) Date of Patent: Feb. 18, 2025

(54) SOLENOID DRIVEN ACTUATOR

(71) Applicant: Hamilton Sundstrand Corporation, Charlotte, NC (US)

(72) Inventors: Ryan Susca, Windsor, CT (US); Morgan O'Rorke, West Hartford, CT (US); Todd Haugsjaahabink, Springfield, MA (US)

(73) Assignee: hamilton sundstrand corporation, Charlotte, NC (US)

( * ) Notice: Subject to any disclaimer, the term of this patent is extended or adjusted under 35 U.S.C. 154(b) by 379 days.

(21) Appl. No.: 17/450,800

(22) Filed: Oct. 13, 2021

(65) Prior Publication Data

US 2023/0111165 A1   Apr. 13, 2023

(51) Int. Cl.
| | |
|---|---|
| *F15B 13/04* | (2006.01) |
| *F15B 13/043* | (2006.01) |
| *F15B 13/044* | (2006.01) |
| *F16K 11/07* | (2006.01) |

(52) U.S. Cl.
CPC ...... *F15B 13/0402* (2013.01); *F15B 13/0431* (2013.01); *F15B 13/044* (2013.01); *F16K 11/07* (2013.01)

(58) Field of Classification Search
CPC .............. F15B 13/0402; F15B 13/0431; F15B 13/044; F15B 13/043; F15B 2211/6355; F15B 2211/7053; F15B 2211/8752; F15B 2211/8757; F15B 2211/8636; F15B 2211/30565; F15B 2211/3057; F16K 11/07
See application file for complete search history.

(56) References Cited

U.S. PATENT DOCUMENTS

| | | |
|---|---|---|
| 4,581,978 A | 4/1986 | Thebert |
| 6,755,214 B2 | 6/2004 | Bento |
| 10,988,126 B2 | 4/2021 | Roether et al. |
| 2019/0257328 A1 | 8/2019 | Erikksson et al. |

FOREIGN PATENT DOCUMENTS

| | | |
|---|---|---|
| DE | 102015122929 A1 | 6/2017 |
| EP | 3282157 A1 | 2/2018 |
| JP | 02312286 A | 12/1992 |

OTHER PUBLICATIONS

Translation of DE102015122929 (Year: 2023).*
Extended European Search Report dated Feb. 22, 2023, received for corresponding European Application No. 22189787.9, pp. 7.

* cited by examiner

*Primary Examiner* — Kelsey E Cary
(74) *Attorney, Agent, or Firm* — Kinney & Lange, P.A.

(57) ABSTRACT

A method of controlling an actuator includes switching a primary solenoid valve to a first mode to fluidically connect a supply pressure source to a control chamber of a pilot valve. A fluid from the supply pressure source is directed through the primary solenoid valve to fill the control chamber of the pilot valve and put the pilot valve in a first position. The first position fluidically connects a second chamber of the actuator to a return pressure source. The actuator includes a cylinder between the first chamber and the second chamber and a rod attached to the cylinder. The fluid from the supply pressure source is directed into the first chamber of the actuator to move the cylinder and the rod in a first direction while the pilot valve is in the first position.

11 Claims, 8 Drawing Sheets

SOLENOID DRIVEN ACTUATOR

STATEMENT OF GOVERNMENT INTEREST

This invention was made with government support under contract number (withheld) awarded by The United States Air Force. The government has certain rights in the invention.

BACKGROUND

The present disclosure relates to a system, particularly to a system to control an actuator.

Turbine engines frequently utilize effector actuation systems to modulate an actuator to control the angle of a valve, an area of a nozzle, and the position of other flow surfaces. Traditional effector actuation systems are heavy and take up a lot of space. For example, a standard effector actuation system can include at least two electro-hydraulic servo valves and a solenoid-driven transfer valve. In modern turbine engines, weight and space are more critical than earlier engines because of the increased external components added to improve engine efficiency. A system to decrease the weight and footprint of an actuation system is described herein.

SUMMARY

In one example, a system includes a supply source and a return pressure source. A primary solenoid valve is fluidically connected to the supply pressure source and is fluidically connected to the return pressure source. A pilot valve is fluidically connected to the supply pressure source, fluidically connected to the return pressure source, and fluidically connected to the primary solenoid valve. The pilot valve includes a first position and a second position. The primary solenoid valve is configured to use the supply pressure source to actuate the pilot valve into the first position. The primary solenoid valve is configured to use a return pressure source to actuate the pilot valve into the second position. An actuator includes a housing, a first chamber within the housing and fluidically connected to the pilot valve, and a second chamber within the housing. The second chamber is also fluidically connected to the pilot valve. A cylinder located within the housing is between the first chamber and the second chamber. A rod is attached to the cylinder. The pilot valve in the first position fluidically connects the supply pressure source and the first chamber of the actuator and fluidically connects return pressure source and the second chamber of the actuator to move the rod of the actuator in a first direction. The pilot valve in the second position fluidically connects the return pressure source and the first chamber and fluidically connects the supply pressure source and the second chamber to move the rod of the actuator in a second direction.

In another example, a method of controlling an actuator includes switching a primary solenoid valve to a first mode to fluidically connect a supply pressure source to a control chamber of a pilot valve. A fluid from the supply pressure source is directed through the primary solenoid valve to fill the control chamber of the pilot valve and put the pilot valve in a first position. The first position fluidically connects a second chamber of the actuator to a return pressure source. The actuator includes a cylinder between the first chamber and the second chamber and a rod attached to the cylinder. The fluid from the supply pressure source is directed into the first chamber of the actuator to move the cylinder and the rod in a first direction while the pilot valve is in the first position.

Persons of ordinary skill in the art will recognize that other aspects and embodiments of the present invention are possible in view of the entirety of the present disclosure, including the accompanying figures.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

This disclosure relates to a system to control a two-position actuator. A two-position actuator can reduce the space and weight of the system in comparison to traditional actuation systems. The system includes a primary solenoid valve and a pilot valve to fluidically connect a first chamber and a second chamber of the two-position actuator to a supply pressure source or a return pressure source. The supply pressure source can pressurize the first chamber, and the return pressure source can depressurize the second chamber to move a cylinder and a rod of the actuator in a first direction. In another mode, the supply pressure source can pressurize the second chamber, and the return pressure source can depressurize the first chamber to move the cylinder and rod of the actuator in a second direction. A secondary solenoid valve and a selector valve can be added to the system to provide an alternative control source if the primary solenoid valve fails. The system will be described below with reference to FIGS. 1-8.

Figure 1:
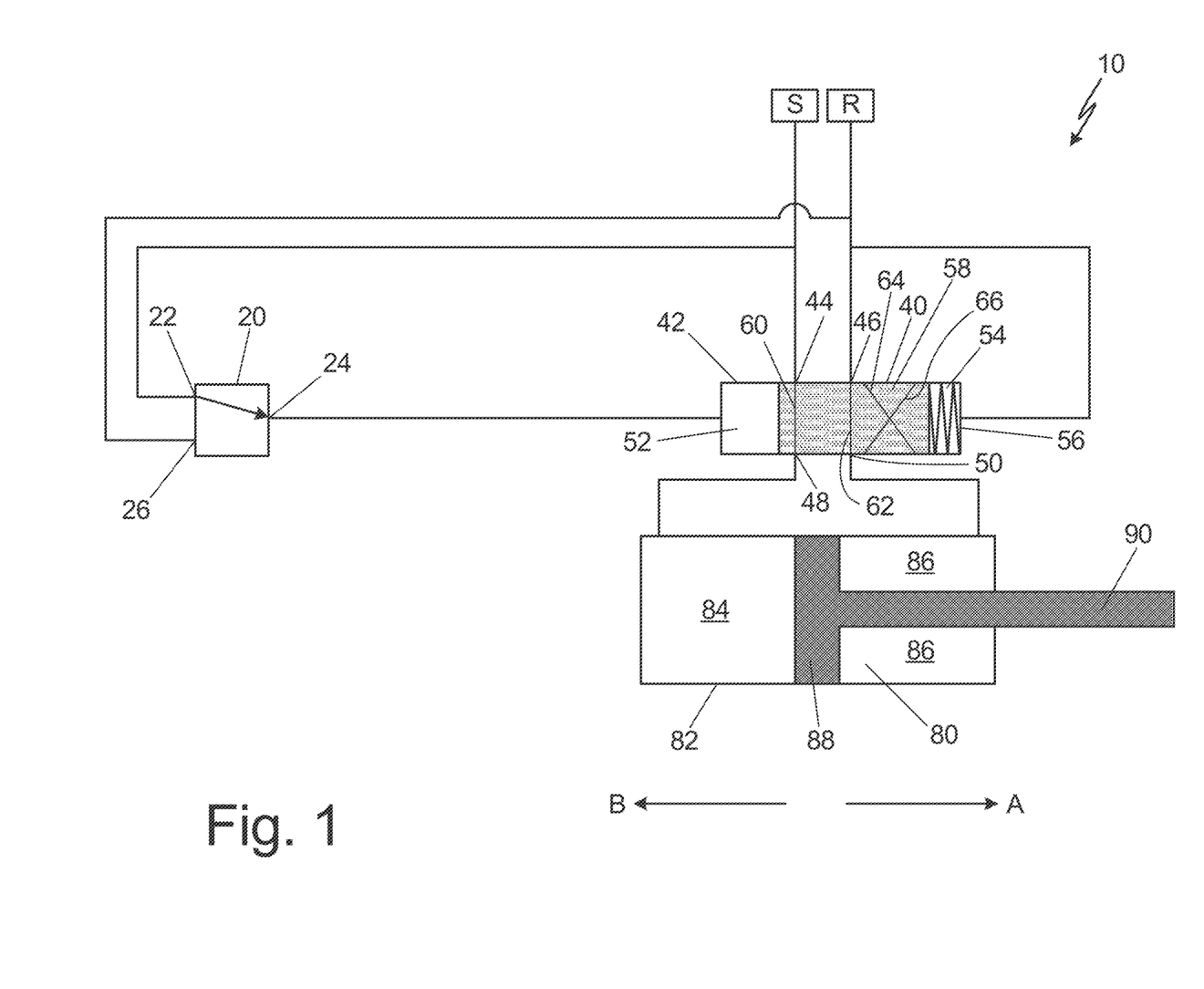
FIG. 1 is a schematic diagram of a system.

FIG. 1 is a schematic diagram of system 10. System 10 includes supply pressure source S, return pressure source R, primary solenoid valve 20, pilot valve 40, and actuator 80. Primary solenoid valve 20 includes first port 22, second port 24, and third port 26. Primary solenoid valve 20 operates in first mode 28 (first shown in FIG. 2) and second mode 30 (first shown in FIG. 3). Pilot valve 40 includes pilot valve housing 42, control chamber 52, spring chamber 54, spring 56, and valve block 58. Pilot valve housing 42 includes supply port 44, return port 46, first actuator port 48, and second actuator port 50. Valve block 58 includes first window 60, second window 62, third window 64, and fourth window 66. Valve block 58 operates between first position 68 (first shown in FIG. 2) and second position 70 (first shown in FIG. 3). Actuator 80 includes housing 82, first chamber 84, second chamber 86, cylinder 88, and rod 90. Cylinder 88 and rod 90 move in first direction A and second direction B.

Primary solenoid valve 20 is fluidically connected to supply pressure source S and is fluidically connected to return pressure source R. More specifically, first port 22 of primary solenoid valve 20 is fluidically connected to supply pressure source S, and third port 26 of primary solenoid valve 20 is fluidically connected to return pressure source R.

Pilot valve 40 is fluidically connected to supply pressure source S, return pressure source R, and primary solenoid valve 20. Supply port 44 of pilot valve housing 42 is fluidically connected to supply pressure source S. Return port 46 of pilot valve housing 42 is fluidically connected to return pressure source R. First actuator port 48 of pilot valve housing 42 fluidically connects first chamber 84 of actuator 80 and pilot valve 40. Second actuator port 50 of pilot valve housing 42 fluidically connects second chamber 86 of actuator 80 and pilot valve 40. Control chamber 52, spring chamber 54, and valve block 58 are all within pilot valve housing 42. Spring 56 is within spring chamber 54. Control chamber 52 is fluidically connected to second port 24 of primary solenoid valve 20. Spring chamber 54 is fluidically connected to return pressure source R. Valve block 58 is within pilot valve housing 42 between control chamber 52 and spring chamber 54. Valve block 58 actuates within pilot valve housing 42 between first position 68 (first shown in FIG. 2) and second position 70 (first shown in FIG. 3).

First chamber 84 of actuator 80 is within housing 82. First chamber 84 is fluidically connected to first actuator port 48 of pilot valve housing 42. Second chamber 86 of actuator 80 is also within housing 82. Second chamber 86 is fluidically connected to second actuator port 50 of pilot valve housing 42. Cylinder 88 is located within housing 82. Cylinder 88 is between first chamber 84 and second chamber 86. Rod 90 is attached to cylinder 88 and extends through second chamber 86 and housing 82.

Figure 2:
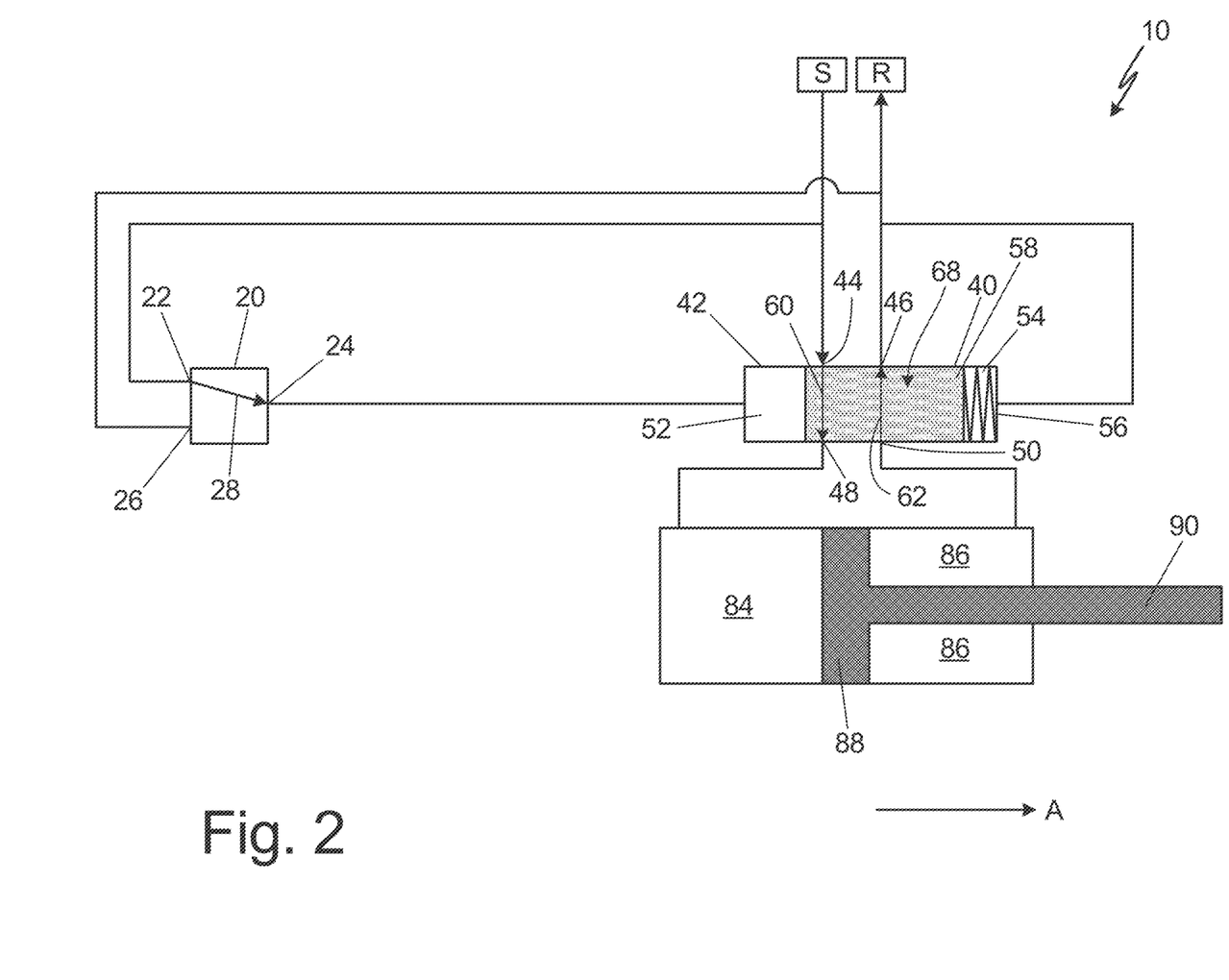
FIG. 2 is a schematic diagram of the system of FIG. 1 with a primary solenoid valve in a first mode.

FIG. 2 is a schematic diagram of system 10 of FIG. 1 with primary solenoid valve 20 in first mode 28. In first mode 28, primary solenoid valve 20 fluidically connects first port 22 and second port 24. As discussed above, first port 22 of primary solenoid valve 20 is fluidically connected to supply pressure source S and second port 24 is fluidically connected to control chamber 52. Therefore, when primary solenoid valve 20 is in first mode 28, primary solenoid valve 20 fluidically connects supply pressure source S and control chamber 52 to pressurize control chamber 52. The pressure within control chamber 52 moves valve block 58 of pilot valve 40 into first position 68. Spring chamber 54 is fluidically connected to return pressure source R to prevent pressure build up within spring chamber 54 as valve block 58 moves into first position 68.

In first position 68, first window 60 fluidically connects supply port 44 of pilot valve housing 42 and first actuator port 48 of pilot valve housing 42. Thus, in first position 68, valve block 58 of pilot valve 40 fluidically connects supply pressure source S and first chamber 84 of actuator 80 to pressurize first chamber 84. In first position 68, second window 62 fluidically connects return port 46 of pilot valve housing 42 and second actuator port 50 of pilot valve housing 42. Thus, in first position 68, pilot valve 40 also fluidically connects return pressure source R and second chamber 86 of actuator 80 to depressurize second chamber 86. As a result of supply pressure source S pressurizing first chamber 84 of actuator 80 and return pressure source R depressurizing second chamber 86 of actuator 80, cylinder 88 and rod 90 move in first direction A.

In operation, system 10, as described in FIGS. 2, can control actuator 80 by switching primary solenoid valve 20 to first mode 28. In first mode 28, primary solenoid valve 20 fluidically connects supply pressure source S to control chamber 52 of pilot valve 40. A fluid (not shown) is directed from supply pressure source S through primary solenoid valve 20 and into control chamber 52 to pressurize control chamber 52 and put pilot valve 40 in first position 68. In first position 68, pilot valve 40 fluidically connects supply pressure source S to first chamber 84 of actuator 80 and fluidically connects return pressure source R to second chamber 86 of actuator 80. Thus, the fluid from supply pressure source S is directed into first chamber 84 of actuator 80. The fluid from supply pressure source S pressurizes first chamber 84 of actuator 80 and moves cylinder 88 and rod 90 in first direction A.

Figure 3:
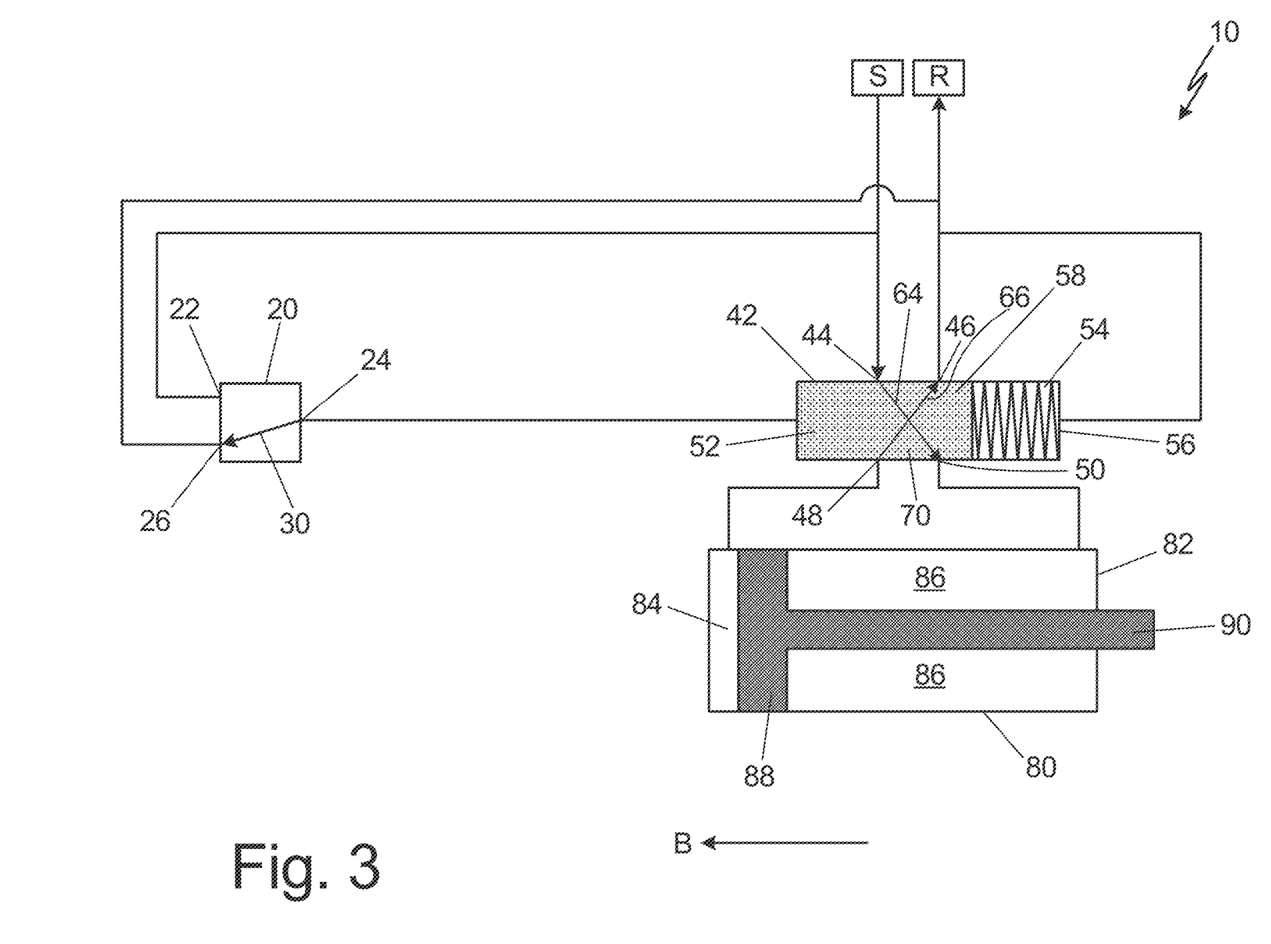
FIG. 3 is a schematic diagram of the system of FIG. 1 with the primary solenoid valve in a second mode.

FIG. 3 is a schematic diagram of system 10 of FIG. 1 with primary solenoid valve 20 in second mode 30. In second mode 30, primary solenoid valve 20 fluidically connects second port 24 and third port 26. As discussed above, third port 26 is fluidically connected to return pressure source R and second port 24 is fluidically connected to control chamber 52. Therefore, when primary solenoid valve 20 is in second mode 30, primary solenoid valve 20 fluidically connects return pressure source R and control chamber 52 to depressurize control chamber 52. When primary solenoid valve 20 is in second mode 30, valve block 58 moves into second position 70 because control chamber 52 is depressurized and spring 56 within spring chamber 54 urges valve block 58 toward second position 70.

In second position 70, third window 64 fluidically connects supply port 44 of pilot valve housing 42 and second actuator port 50 of pilot valve housing 42. Thus, in second position 70, pilot valve 40 also fluidically connects supply pressure source S and second chamber 86 of actuator 80 to pressurize second chamber 86. In second position 70, fourth window 66 fluidically connects return port 46 of pilot valve housing 42 and second actuator port 50 of pilot valve housing 42. Thus, in second position 70, pilot valve 40 fluidically connects return pressure source R and first chamber 84 of actuator 80 to depressurize first chamber 84. As a result of supply pressure source S pressurizing second chamber 86 of actuator 80 and return pressure source R depressurizing first chamber 84 of actuator 80, cylinder 88 and rod 90 move in second direction B.

In operation, system 10, as described in FIGS. 3, can control actuator 80 by switching primary solenoid valve 20 to second mode 30. In second mode 30, primary solenoid valve 20 fluidically disconnects supply pressure source S from control chamber 52 of pilot valve 40 and fluidically connects return pressure source R to control chamber 52 of pilot valve 40. Return pressure source R evacuates the fluid in control chamber 52 via primary solenoid valve 20 and spring 56 urges valve block 58 into second position 70 within pilot valve housing 42. In second position 70, pilot valve 40 fluidically connects supply pressure source S to second chamber 86 of actuator 80 and fluidically connects return pressure source R to first chamber 84 of actuator 80. The fluid (not shown) from supply pressure source S fills and pressurizes second chamber 86 of actuator 80 and moves cylinder 88 and rod 90 in second direction B.

Figure 4:
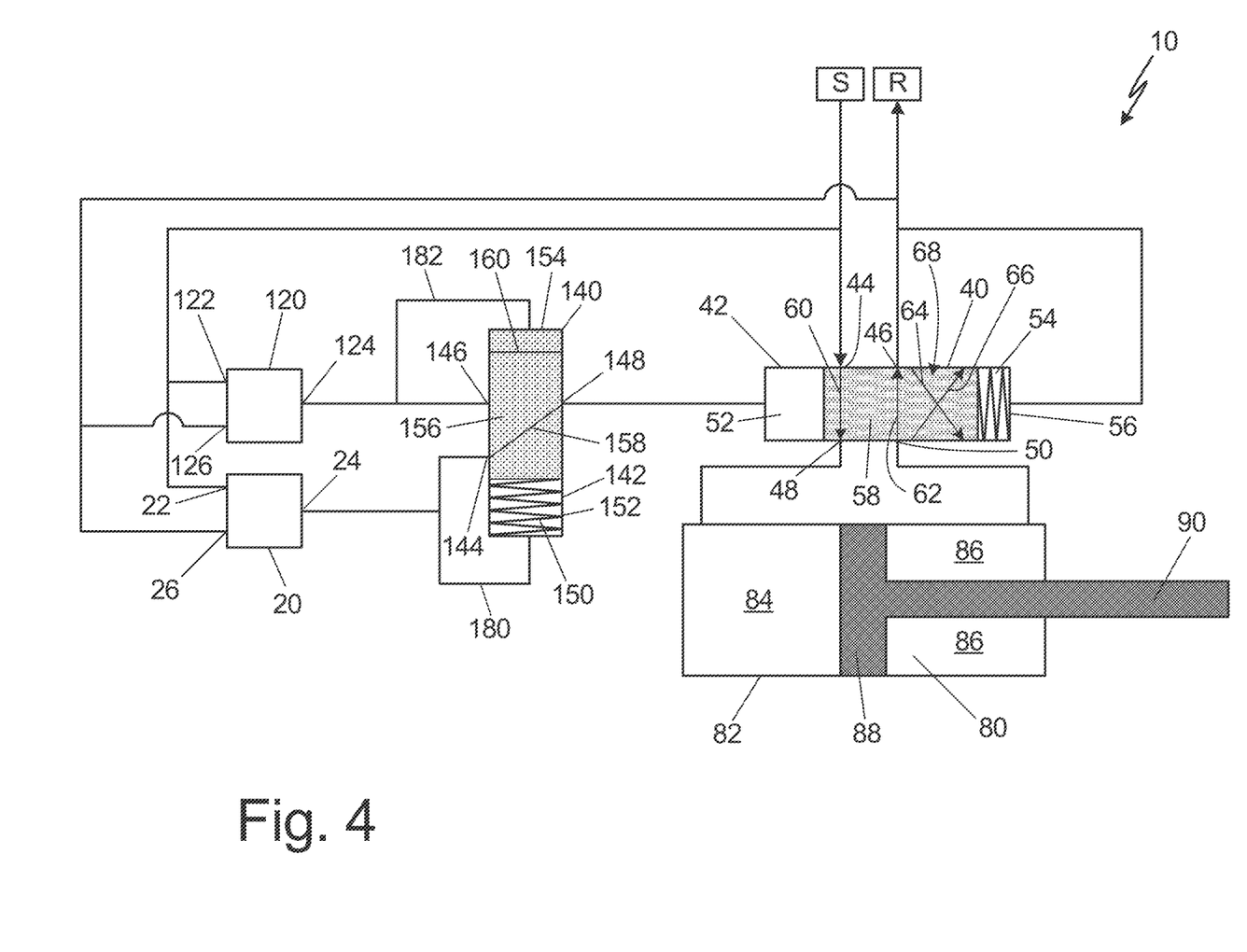
FIG. 4 is a schematic diagram of an alternative example of the system.

FIG. 4 is a schematic diagram of an alternative example of system 10. As shown in FIG. 4, system 10 includes secondary solenoid valve 120, selector valve 140, primary control line 180, and secondary control line 182. Secondary solenoid valve 120 includes first port 122, second port 124, and third port 126. Secondary solenoid valve 120 operates in first mode 128 (first shown in FIG. 7) and second mode 130 (first shown in FIG. 5). Selector valve 140 includes selector valve housing 142, primary chamber 150, second spring 152, secondary chamber 154, and selector valve block 156. Selector valve housing 142 includes first port 144, second port 146, and third port 148. Selector valve block 156 includes first passage 158, and second passage 160. Selector valve block 156 moves within selector valve housing 142 between primary position 162 (first shown in FIG. 5) and secondary position 164 (first shown in FIG. 7).

Secondary solenoid valve 120 is fluidically connected to supply pressure source S and is fluidically connected to return pressure source R. More specifically, first port 122 of secondary solenoid valve 120 is fluidically connected to supply pressure source S, and third port 126 is fluidically connected to return pressure source R.

Selector valve 140 is fluidically connected to second port 24 of primary solenoid valve 20 and second port 124 of secondary solenoid valve 120. First port 144 of selector valve housing 142 is fluidically connected to second port 24 of primary solenoid valve 20. Second port 146 of selector valve housing 142 is fluidically connected to second port 124 of secondary solenoid valve 120. Third port 148 of selector valve housing 142 is fluidically connected to control chamber 52 of pilot valve 40. Primary chamber 150 of selector valve 140 is within selector valve housing 142. Primary control line 180 fluidically connects second port 24 of primary solenoid valve 20 and primary chamber 150 of selector valve 140. Second spring 152 is within primary chamber 150 of selector valve 140. Secondary chamber 154 of selector valve 140 is within selector valve housing 142. Secondary control line 182 fluidically connects second port 124 of secondary solenoid valve 120 and secondary chamber 154 of selector valve 140.

Selector valve block 156 is positioned within selector valve housing 142 of selector valve 140 between primary chamber 150 and secondary chamber 154. Secondary chamber 154 moves between primary position 162 and secondary position 164 within selector valve housing 142.

Figure 5:
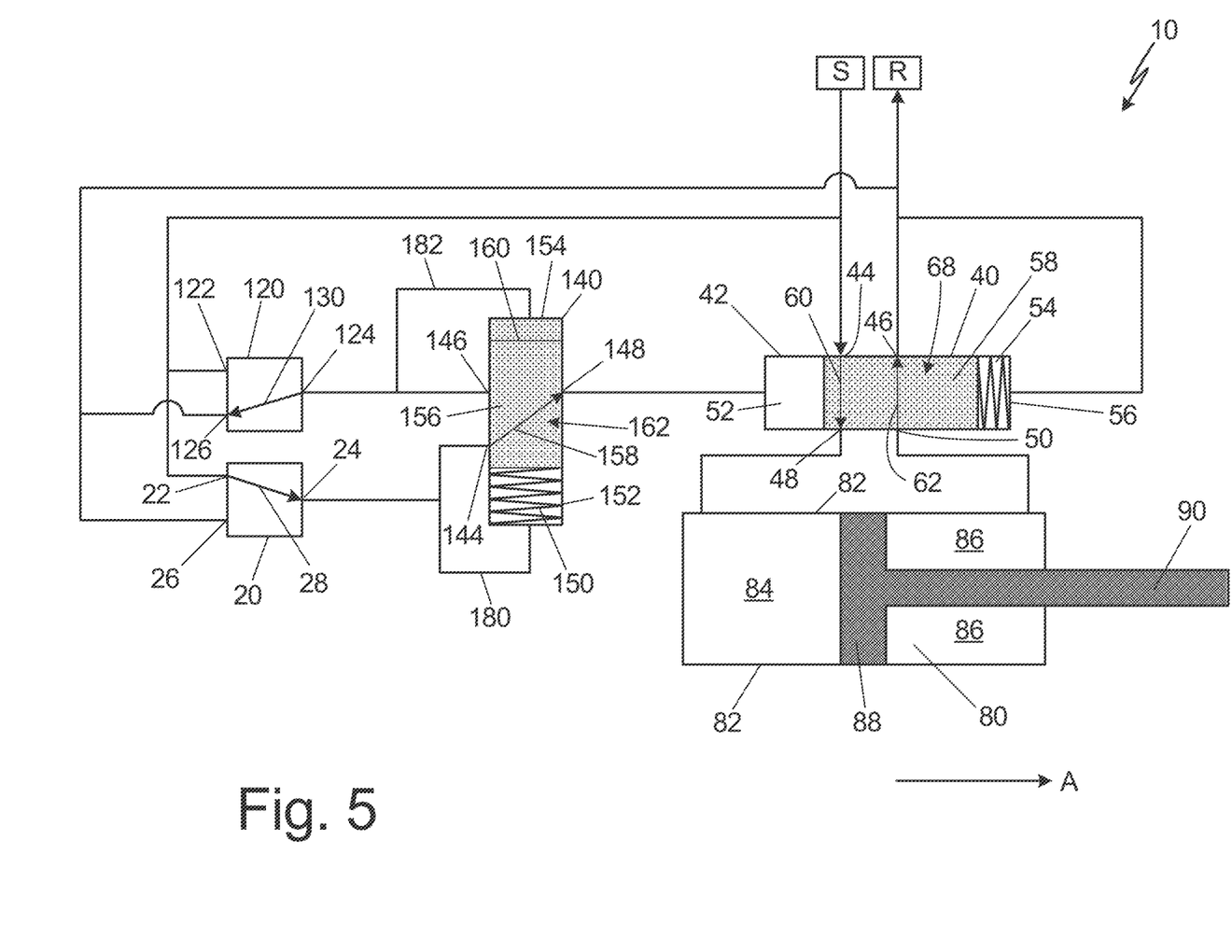
FIG. 5 is a schematic diagram of the system of FIG. 4 with a primary solenoid valve in a first mode.

FIG. 5 is a schematic diagram of system 10 of FIG. 4 with primary solenoid valve 20 in first mode 28. Primary control line 180 fluidically connects second port 24 of primary solenoid valve 20 to primary chamber 150 of selector valve 140. In first mode 28, primary solenoid valve 20 fluidically connects primary chamber 150 of selector valve 140 to supply pressure source S to maintain selector valve block 156 of selector valve 140 in primary position 162. Second mode 130 is the default mode of secondary solenoid valve 120 while primary solenoid valve 20 is operational. In second mode 130, secondary solenoid valve 120 and secondary control line 182 fluidically connect return pressure source R to secondary chamber 154 of selector valve 140 to depressurize secondary chamber 154. Additionally, when selector valve block 156 of selector valve 140 is in primary position 162, secondary solenoid valve 120 is shut-off to control chamber 52 of pilot valve 40. When selector valve block 156 of selector valve 140 is in primary position 162, first passage 158 of selector valve block 156 fluidically connects first port 22 of primary solenoid valve 20 to third port 148 of selector valve 140. As discussed above, supply pressure source S is fluidically connected to first port 22, and third port 148 is fluidically connected to control chamber 52 of pilot valve 40. Thus, in primary position 162, selector valve 140 fluidically connects supply pressure source S to control chamber 52 of pilot valve 40 to pressurize control chamber 52 and to move pilot valve 40 in to first position 68.

As discussed above, in first position 68, valve block 58 of pilot valve 40 fluidically connects supply pressure source S and first chamber 84 of actuator 80 to pressurize first chamber 84. In first position 68, pilot valve 40 also fluidically connects return pressure source R and second chamber 86 of actuator 80 to depressurize second chamber 86. As a result of supply pressure source S pressurizing first chamber 84 of actuator 80 and return pressure source R depressurizing second chamber 86 of actuator 80, cylinder 88 and rod 90 move in first direction A.

In operation, system 10, as described in FIGS. 4 and 5, can control actuator 80 by switching primary solenoid valve 20 to first mode 28. In first mode 28, primary solenoid valve 20 directs the fluid (not shown) from supply pressure source S through primary solenoid valve 20 and into primary control line 180. Primary control line 180 directs the fluid (not shown) from supply pressure source S into primary chamber 150 to pressurize primary chamber 150 and move selector valve block 156 to primary position 162 within selector valve housing 142. In primary position 162, selector valve 140 directs supply pressure source S through first passage 158 of selector valve block 156 and into control chamber 52 of pilot valve 40 to pressurize control chamber 52 and move pilot valve 40 into first position 68. In first position 68, pilot valve 40 fluidically connects supply pressure source S to first chamber 84 of actuator 80 and fluidically connects return pressure source R to second chamber 86 of actuator 80. Thus, the fluid (not shown) from supply pressure source S is directed into first chamber 84 of actuator 80. The fluid from supply pressure source S pressurizes first chamber 84 of actuator 80 and moves cylinder 88 and rod 90 in first direction A.

Figure 6:
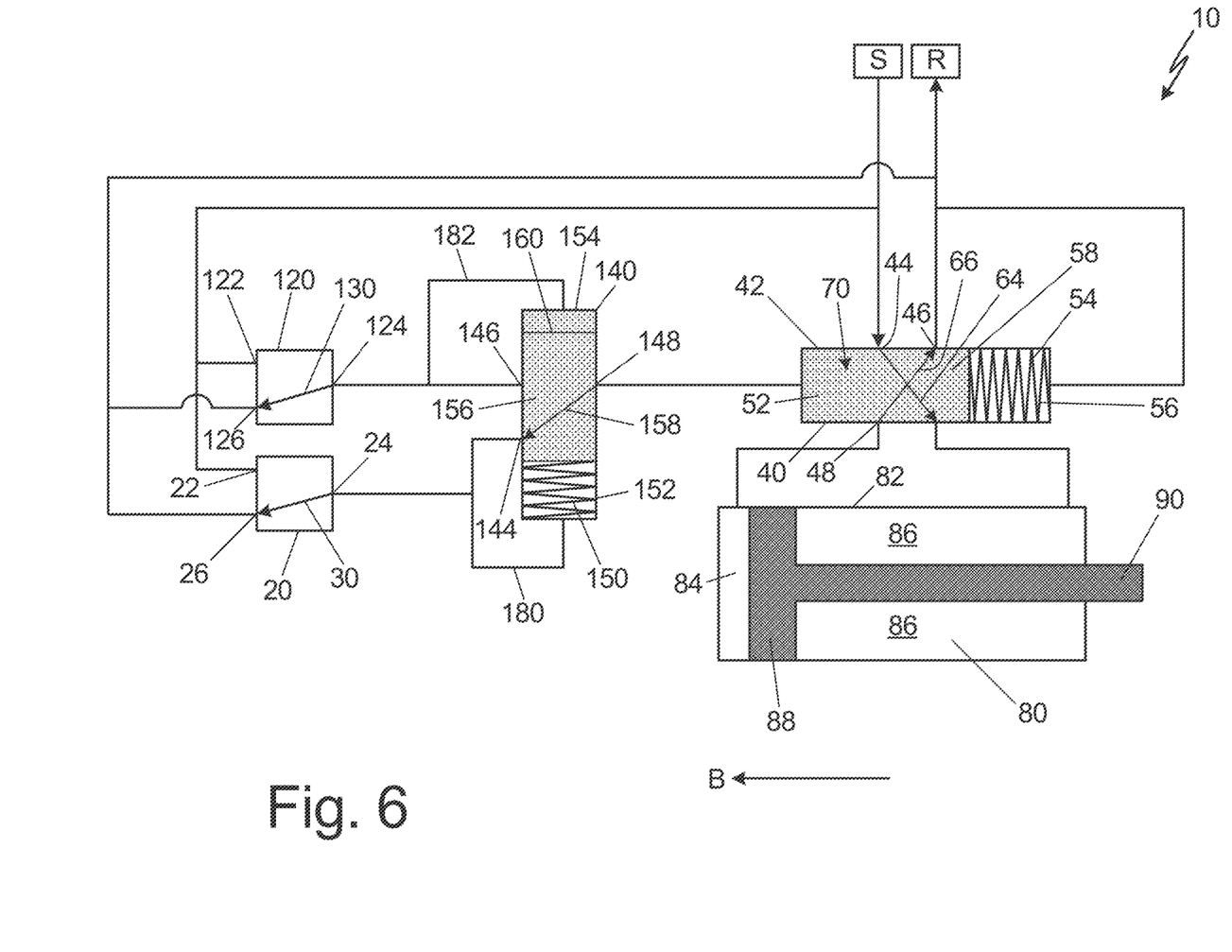
FIG. 6 is a schematic diagram of the system of FIG. 4 with the primary solenoid valve in the second mode.

FIG. 6 is a schematic diagram of system 10 of FIG. 4 with primary solenoid valve 20 in second mode 30. In second mode 30, primary solenoid valve 20 fluidically connects primary control line 180, and primary chamber 150 of selector valve 140 to return pressure source R. Return pressure source R depressurizes primary chamber 150 of selector valve 140. However, second spring 152 biases and maintains selector valve block 156 in primary position 162. In second mode 30, primary solenoid valve 20 also fluidically connects control chamber 52 of pilot valve 40 to return pressure source R via first passage 158. Return pressure source R depressurizes control chamber 52 of pilot valve 40 and spring 56 urges valve block 58 of pilot valve 40 to second position 70 within pilot valve housing 42.

As discussed above, in second position 70, pilot valve 40 fluidically connects return pressure source R and first chamber 84 of actuator 80 to depressurize first chamber 84. In second position 70, pilot valve 40 also fluidically connects supply pressure source S and second chamber 86 of actuator 80 to pressurize second chamber 86. As a result of supply pressure source S pressurizing second chamber 86 of actuator 80 and return pressure source R depressurizing first chamber 84 of actuator 80, cylinder 88 and rod 90 move in second direction B.

Figure 7:
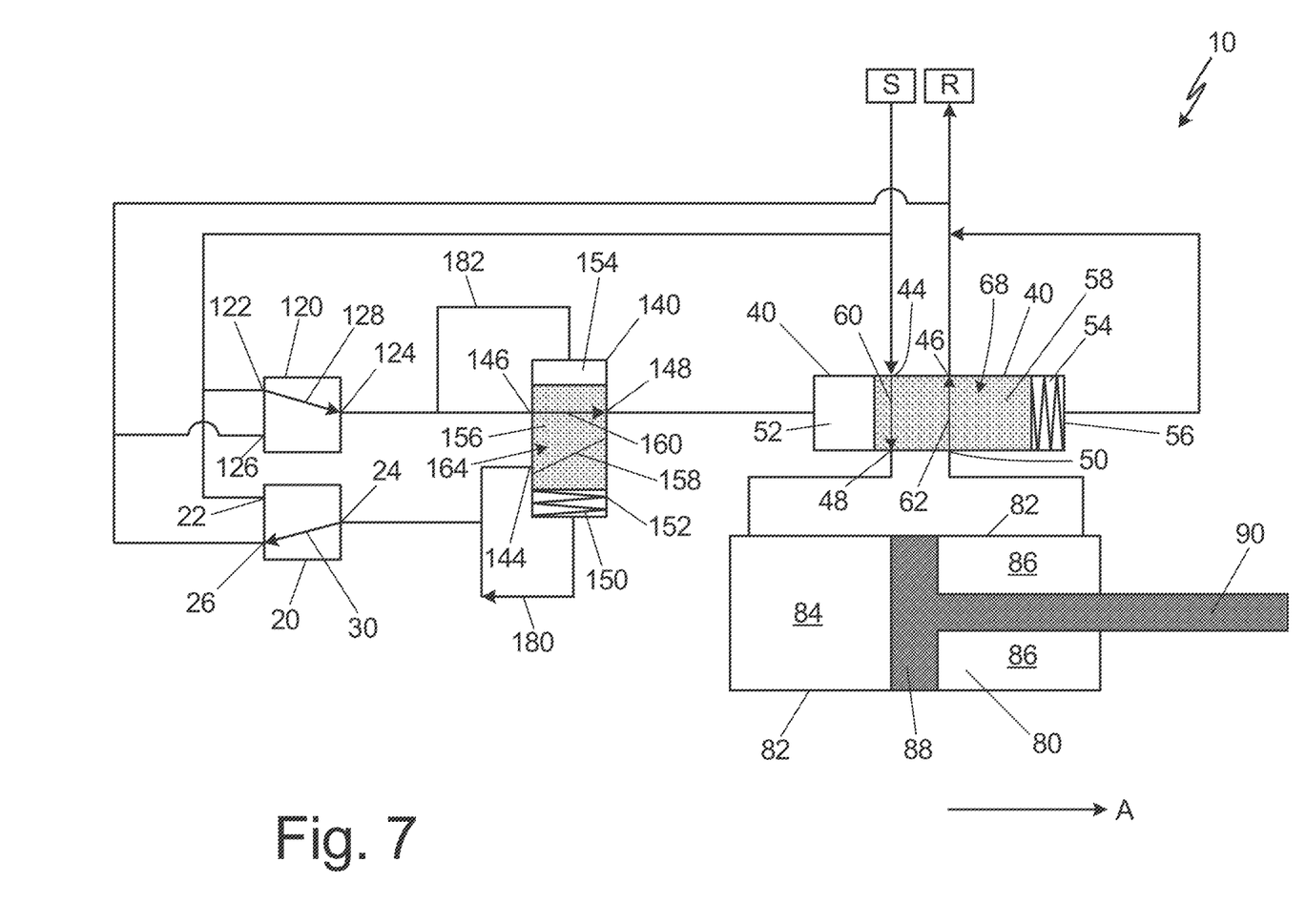
FIG. 7 is a schematic diagram of the system of FIG. 4 with a secondary solenoid valve in a first mode.

In FIG. 7, primary solenoid valve 20 has failed and fail-safed to second mode 30. When that happens, secondary solenoid valve 120 is actuated and moved to first mode 128. In second mode 30, primary solenoid valve 20 fluidically connects primary chamber 150 to return pressure source R to depressurize primary chamber 150. FIG. 7 is a schematic diagram of system 10 of FIG. 4 with secondary solenoid valve 120 in first mode 128. Secondary control line 182 fluidically connects second port 124 of secondary solenoid valve 120 to secondary chamber 154 of selector valve 140. In first mode 128, secondary solenoid valve 120 fluidically connects secondary chamber 154 of selector valve 140 to supply pressure source S. Supply pressure source S pressurizes secondary chamber 154 of selector valve 140 to put selector valve block 156 in secondary position 164 within selector valve housing 142. When selector valve block 156 of selector valve 140 is in secondary position 164, second passage 160 of selector valve block 156 fluidically connects first port 122 of secondary solenoid valve 120 to third port 148 of selector valve 140. Additionally, when selector valve block 156 of selector valve 140 is in secondary position 164, primary solenoid valve 20 is shut-off to control chamber 52 of pilot valve 40. As discussed above, supply pressure source S is fluidically connected to first port 122, and third port 148 is fluidically connected to control chamber 52 of pilot valve 40. Thus, in secondary position 164, selector valve 140 fluidically connects supply pressure source S to control chamber 52 of pilot valve 40 to pressurize control chamber 52 and to move pilot valve 40 to first position 68.

As discussed above, in first position 68, valve block 58 of pilot valve 40 fluidically connects supply pressure source S and first chamber 84 of actuator 80 to pressurize first chamber 84. In first position 68, pilot valve 40 also fluidically connects return pressure source R and second chamber 86 of actuator 80 to depressurize second chamber 86. As a result of supply pressure source S pressurizing first chamber 84 of actuator 80 and return pressure source R depressurizing second chamber 86 of actuator 80, cylinder 88 and rod 90 move in first direction A.

In operation, system 10, as described in FIGS. 4-7, can also control actuator 80 by switching secondary solenoid valve 120 to first mode 128. As discussed above, the fail-safe mode of primary solenoid valve 20 is second mode 30. If primary solenoid valve 20 fails, secondary solenoid valve 120 can be switched to first mode 128. In first mode 128, secondary solenoid valve 120 directs the fluid (not shown) from supply pressure source S through secondary solenoid valve 120 and into secondary control line 182. Secondary control line 182 directs the fluid (not shown) from supply pressure source S into secondary chamber 154 to pressurize primary chamber 150 and move selector valve block 156 to secondary position 164 within selector valve housing 142. In secondary position 164, selector valve 140 directs supply pressure source S through second passage 160 of selector valve block 156 and into control chamber 52 of pilot valve 40 to pressurize control chamber 52 and move pilot valve 40 into first position 68. In first position 68, pilot valve 40 fluidically connects supply pressure source S to first chamber 84 of actuator 80 and fluidically connects return pressure source R to second chamber 86 of actuator 80. Thus, the fluid (not shown) from supply pressure source S is directed into first chamber 84 of actuator 80. The fluid (not shown) from supply pressure source S pressurizes first chamber 84 of actuator 80 and moves cylinder 88 and rod 90 in first direction A.

While secondary solenoid valve 120 is switched to first mode 128 system 10 can switch or default primary solenoid valve 20 to second mode 30. In second mode 30, primary solenoid valve 20 directs fluid from primary chamber 150 to return pressure source R.

Figure 8:
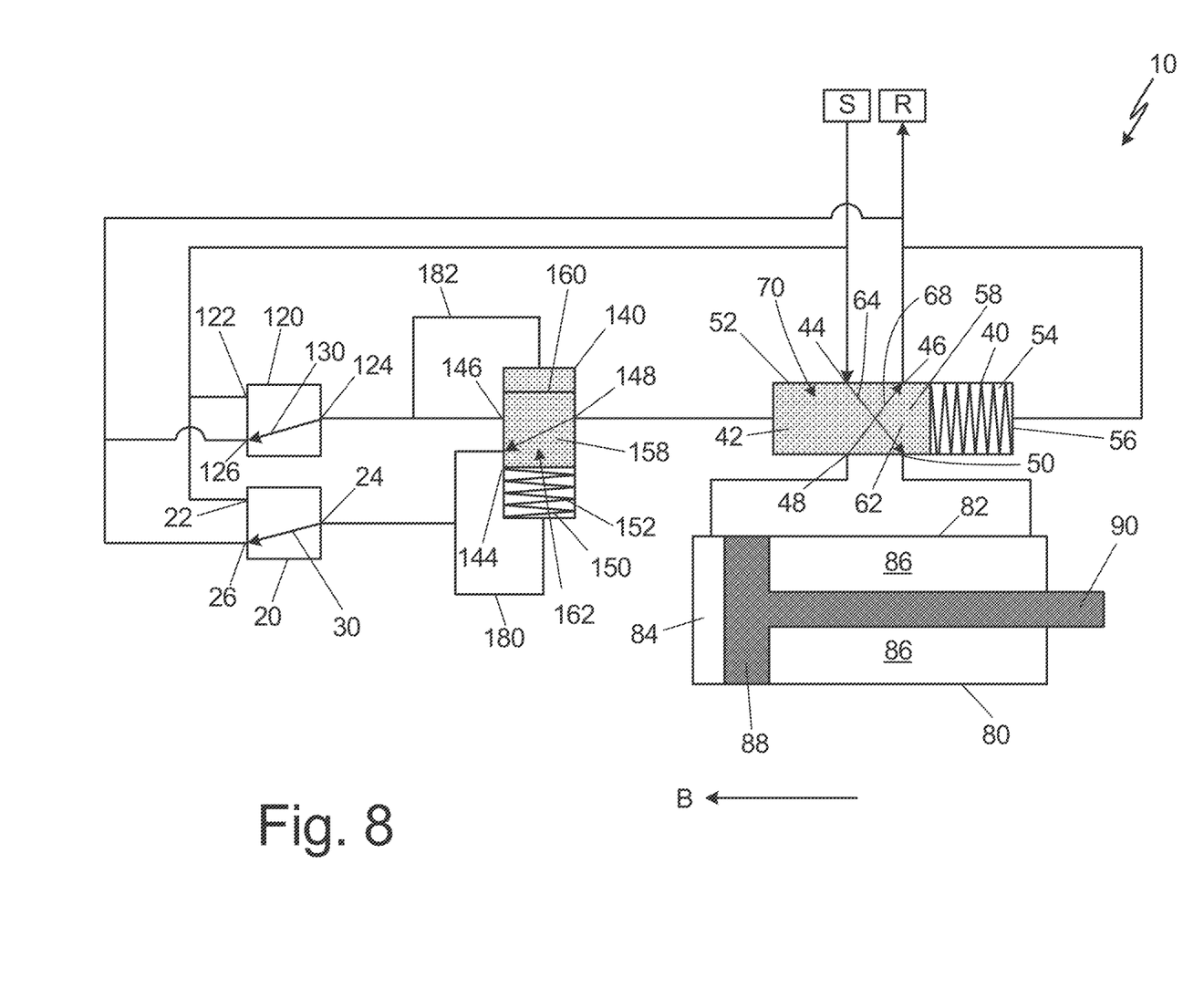
FIG. 8 is a schematic diagram of the system of FIG. 4 with a secondary solenoid valve in a second mode.

FIG. 8 is a schematic diagram of system 10 of FIG. 4 with secondary solenoid valve 120 in second mode 130 and primary solenoid valve 20 fail-safed to second mode 30. In second mode 130, secondary solenoid valve 120 fluidically connects secondary chamber 154 of selector valve 140 to return pressure source R. Return pressure source R depressurizes secondary chamber 154 of selector valve 140 and second spring 152 urges selector valve block 156 into primary position 162. Second mode 30 is the fail-safe mode for primary solenoid valve 20. Thus, when secondary solenoid valve 120 is in second mode 130 and selector valve block 156 is urged into primary position 162 by second spring 152, control chamber 52 is fluidically connected to return pressure source R via first passage 158 and primary solenoid valve 20. As a result of first passage 158 and primary solenoid valve 20 fluidically connecting return pressure source R and control chamber 52, control chamber 52 is depressurized and spring 56 urges pilot valve housing 42 to second position 70.

As discussed above, in second position 70, pilot valve 40 fluidically connects return pressure source R and first chamber 84 of actuator 80 to depressurize first chamber 84. In second position 70, pilot valve 40 also fluidically connects supply pressure source S and second chamber 86 of actuator 80 to pressurize second chamber 86. As a result of supply pressure source S pressurizing second chamber 86 of actuator 80 and return pressure source R depressurizing first chamber 84 of actuator 80, cylinder 88 and rod 90 move in second direction B.

In operation, system 10, as described in FIGS. 4-8, can also control actuator 80 by switching secondary solenoid valve 120 to second mode 130. As discussed above, the fail-safe mode of primary solenoid valve 20 is second mode 30. In second mode 130, secondary solenoid valve 120 fluidically connects primary chamber 150 to return pressure source R to depressurize primary chamber 150. As primary chamber 150 is depressurized, second spring 152 urges selector valve block 156 back to primary position 162 within selector valve housing 142. In primary position 162, selector valve 140 fluidically connects control chamber 52 and first passage 158. As discussed above, primary solenoid valve 20 is in second mode 30. Thus, primary solenoid valve 20 and first passage 158 of selector valve 140 fluidically connect control chamber 52 to return pressure source R to depressurize control chamber 52 of pilot valve 40. As control chamber 52 is depressurized, spring 56 urges valve block 58 into second position 70. In second position 70, pilot valve 40 fluidically connects supply pressure source S to second chamber 86 of actuator 80 and fluidically connects return pressure source R to first chamber 84 of actuator 80. The fluid (not shown) from supply pressure source S fills and pressurizes second chamber 86 of actuator 80 and moves cylinder 88 and rod 90 in second direction B.

System 10 as described with reference to FIGS. 1-8 is beneficial over modulated actuation systems because solenoid valves, like primary solenoid valve 20 and secondary solenoid valve 120, have less internal leakage than electro-hydraulic servo valves. Moreover, system 10 utilizes more simplistic control systems than modulated actuation systems. To further decrease the weight of system 10, system 10 can include a proximity sensor to detect the actuator position. The proximity sensor can be utilized on system 10 because system 10 is a two-position actuator system. Modulated actuation systems require heavier, and more complex linear variable differential transformers to detect the modulating position of the actuator. In the examples of FIGS. 1-8, supply pressure source S can be any high-pressure source on an aircraft or vehicle and return pressure source R can be any low-pressure system on an aircraft or vehicle.

Discussion of Possible Embodiments

The following are non-exclusive descriptions of possible embodiments of the present invention.

A system includes a supply source and a return pressure source. A primary solenoid valve is fluidically connected to the supply pressure source and is fluidically connected to the return pressure source. A pilot valve is fluidically connected to the supply pressure source, fluidically connected to the return pressure source, and fluidically connected to the primary solenoid valve. The pilot valve includes a first potion and a second position. The primary solenoid valve is configured to use the supply pressure source to actuate the pilot valve into the first position. The primary solenoid valve is configured to use a return pressure source to actuate the pilot valve into the second position. An actuator includes a housing, a first chamber within the housing and fluidically connected to the pilot valve, and a second chamber within the housing. The second chamber is also fluidically connected to the pilot valve. A cylinder located within the housing is between the first chamber and the second chamber. A rod is attached to the cylinder. The pilot valve in the first position fluidically connects the supply pressure source and the first chamber of the actuator and fluidically connects return pressure source and the second chamber of the actuator to move the rod of the actuator in a first direction. The pilot valve in the second position fluidically connects the return pressure source and the first chamber and fluidically connects the supply pressure source and the second chamber to move the rod of the actuator in a second direction.

The system of the preceding paragraph can optionally include, additionally and/or alternatively, any one or more of the following features, configurations and/or additional components:

the primary solenoid valve comprises: a first port fluidically connected to the supply pressure source; a second port; and a third port fluidically connected to return pressure source;

the primary solenoid valve further comprises: a first mode, wherein the primary solenoid valve fluidically connects the first port and the second port in the first mode; and a second mode, wherein the primary solenoid valve fluidically connects the second port and the third port in the second mode;

the pilot valve further comprises: a pilot valve housing comprising: a supply port fluidically connected to the supply pressure source; a return port fluidically connected to the return pressure source; a first actuator port fluidically connecting the first chamber of the actuator and the pilot valve; and a second actuator port fluidically connecting the second chamber of the actuator and the pilot valve; a control chamber within the pilot valve housing and fluidically connected to the second port of the primary solenoid valve; a spring chamber within the pilot valve housing; and a spring within the spring chamber;

the pilot valve further comprises: a valve block within the pilot valve housing between the control chamber and the spring chamber, wherein the valve block comprises: a first window fluidically connecting the supply port and the first actuator port when the pilot valve is in the first position; a second window fluidically connecting the return port and the second actuator port when the pilot valve is in the first position; a third window fluidically connecting the supply port and the second actuator port when the pilot valve is in the second position; and a fourth window fluidically connecting the return port and the second actuator port when the pilot valve is in the second position;

the spring within the spring chamber biases the valve block of the pilot valve in the second position;

when in the first mode the primary solenoid valve fluidically connects the supply pressure source and the control chamber of the pilot valve to move the valve block of the pilot valve into the first position, and wherein when in the second mode the primary solenoid valve fluidically connects the return pressure source and the control chamber of the pilot valve to move the valve block of the pilot valve into the second position;

the spring chamber is fluidically connected with the return pressure source;

a secondary solenoid valve, wherein the secondary solenoid valve comprises: a first port fluidically connected to the supply pressure source; a second port; and a third port fluidically connected to return pressure source; and a selector valve fluidically connected to the second port of the primary solenoid valve and the second port of the secondary solenoid valve, wherein the selector valve comprises: a selector valve housing comprising: a first port fluidically connected to the second port of the primary solenoid valve; a second port fluidically connected to the second port of the secondary solenoid valve; and a third port fluidically connected to the control chamber of the pilot valve; a primary chamber within the selector valve housing and fluidically connected to the second port of the primary solenoid valve; a secondary chamber within the selector valve housing and fluidically connected to the second port of the secondary solenoid valve; a second spring within the primary chamber; and a selector valve block positioned within the selector valve housing and between the primary chamber and the secondary chamber;

the secondary solenoid valve further comprises: a first mode, wherein the secondary solenoid valve fluidically connects the first port of the secondary solenoid valve and the second port of the secondary solenoid valve when in the first mode of the secondary solenoid valve; and a second mode, wherein the secondary solenoid valve fluidically connects the second port of the secondary solenoid valve and the third port of the secondary solenoid valve when in the second mode of the secondary solenoid valve;

the selector valve block comprises: a first passage; a second passage; a primary position within the selector valve housing; and a secondary position within the selector valve housing, wherein when the selector valve block is in the primary position the first passage fluidically connects the second port of the primary solenoid valve to the third port of the selector valve and to the control chamber of the pilot valve and the secondary solenoid valve is fluidically shut-off to the control chamber of the pilot valve, and wherein when the selector valve block is in the secondary position the second passage fluidically connects the second port of the secondary solenoid valve to the third port of the selector valve and to the control chamber of the pilot valve and the primary solenoid valve is fluidically shut-off to the control chamber of the pilot valve;

the second port of the primary solenoid valve is fluidically connected to the primary chamber of the selector valve via a primary control line, wherein when in the first mode of the primary solenoid valve, the primary solenoid valve fluidically connects the primary chamber of the selector valve to the supply pressure source to maintain the valve block of the selector valve in the primary position and fluidically connect the control chamber of the pilot valve to the supply pressure source to put the pilot valve into the first position, and wherein when in the second mode of the primary solenoid valve, the primary solenoid valve fluidically connects the control chamber of the pilot valve, the primary control line, and the primary chamber to the return pressure source, the second spring biases and maintains the selector valve block in the primary position, and the pilot valve moves to the second position of the pilot valve;

the second port of the secondary solenoid valve is fluidically connected to the secondary chamber of the selector valve via a secondary control line, wherein when in the first mode of the secondary solenoid valve, the secondary solenoid valve fluidically connects the secondary chamber of the selector valve to the supply pressure source to put the selector valve block in the secondary position and fluidically connect the supply pressure source to the control chamber of the pilot valve and move the pilot valve into the first position, and wherein when in the second mode of the secondary solenoid valve, the secondary solenoid valve fluidically connects the secondary chamber of the selector valve to the return pressure source to depressurize the secondary chamber and move the selector valve block back to the first position of the selector valve to move the pilot valve into the second position of the pilot valve; and/or the second mode of the primary solenoid valve is a fail-safe position of the primary solenoid valve.

A method of controlling an actuator includes switching a primary solenoid valve to a first mode to fluidically connect a supply pressure source to a control chamber of a pilot valve. A fluid from the supply pressure source is directed through the primary solenoid valve to fill the control chamber of the pilot valve and put the pilot valve in a first position. The first position fluidically connects a second chamber of the actuator to a return pressure source. The actuator includes a cylinder between the first chamber and the second chamber and a rod attached to the cylinder. The fluid from the supply pressure source is directed into the first chamber of the actuator to move the cylinder and the rod in a first direction while the pilot valve is in the first position.

The method of the preceding paragraph can optionally include, additionally and/or alternatively, any one or more of the following features, configurations and/or additional components:

switching the primary solenoid valve to a second mode to fluidically disconnect the supply pressure source from the control chamber of the pilot valve and to fluidically connect the return pressure source with the control chamber of the pilot valve; evacuating the fluid in the control chamber to the return pressure source via the primary solenoid valve to put the pilot valve in a second position that fluidically connects the supply pressure source to the second chamber of the actuator and fluidically connects the first chamber of the actuator to the return pressure source; and directing the fluid from the supply pressure source into the second chamber of the actuator and evacuating the fluid in the first chamber to the return pressure source to move the cylinder and the rod in a second direction while the pilot valve is in the second position;

moving a selector valve into a primary position; and directing the fluid through the selector valve in the primary position after the fluid passes through the primary solenoid valve in the first mode and before the fluid reaches the control chamber of the pilot valve;

directing the fluid in the control chamber through the selector valve in the primary position as the control chamber is being evacuated and before the fluid passes through the primary solenoid valve in the second mode into the return pressure source;

defaulting the primary solenoid valve to the second mode of the primary solenoid valve upon failure of the primary solenoid valve; switching a secondary solenoid valve to a first mode of the secondary solenoid valve to fluidically connect the supply pressure source to the selector valve; directing the fluid from the supply pressure source through the secondary solenoid valve to move the selector valve into a secondary position that fluidically connects the supply pressure source to the control chamber of the pilot valve; filling the control chamber of the pilot valve and put the pilot valve in the first position that fluidically connects the supply pressure source to the first chamber of the actuator and fluidically connects the second chamber of the actuator to the return pressure source; and directing the fluid from the supply pressure source into the first chamber of the actuator to move the cylinder and the rod in the first direction while the pilot valve is in the first position; and/or switching the secondary solenoid valve to a second mode of the secondary solenoid valve to fluidically disconnect the supply pressure source from the selector valve and the control chamber of the pilot valve and to fluidically connect the return pressure source with the control chamber of the pilot valve; urging the selector valve into the primary position by a spring in the selector valve to fluidically connect the control chamber of the pilot valve with the return pressure source via the primary solenoid valve; evacuating the fluid in the control chamber to the return pressure source via the primary solenoid valve to put the pilot valve in the second position that fluidically connects the supply pressure source to the second chamber of the actuator and fluidically connects the first chamber of the actuator to the return pressure source; and directing the fluid from the supply pressure source into the second chamber of the actuator and evacuating the fluid in the first chamber to the return pressure source to move the cylinder and the rod in the second direction while the pilot valve is in the second position.

While the invention has been described with reference to an exemplary embodiment(s), it will be understood by those skilled in the art that various changes may be made and equivalents may be substituted for elements thereof without departing from the scope of the invention. For example, in system 10, as described in FIGS. 1-8, valve block 58 of pilot valve 40 is positioned such that if primary solenoid valve 20 fails and control chamber 52 is depressurized, spring 56 will urge valve block 58 into second position 70. With valve block 58 in second position 70, supply fluid source S pressurizes second chamber 86 and cylinder 88 and rod 90 will move in second direction B. In an alternative example, valve block 58 can be flipped within pilot valve housing 42 such that if primary solenoid valve 20 fails and control chamber 52 is depressurized spring 56 urges valve block 58 into second position 70. With valve block 58 flipped, second position 70 would fluidically connect supply pressure source S to first chamber 84 to move cylinder 88 and rod 90 in first direction A. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   an actuator comprising:
      an actuator housing;
      a first chamber within the actuator housing fluidically;
      a second chamber within the actuator housing;
      a cylinder within the housing and between the first chamber and the second chamber; and
      a rod attached to the cylinder;
   a supply pressure source;
   a return pressure source;
   a pilot valve comprising:
      a pilot valve housing;
      a supply port fluidically connected to the supply pressure source;
      a return port fluidically connected to the return pressure source;
      a first actuator port fluidically connected to the first chamber of the actuator;
      a second actuator port fluidically connected to the second chamber of the actuator;
      a valve block within the pilot valve housing, wherein the valve block comprises:
         a first window fluidically connecting the supply port and the first actuator port when the pilot valve is in a first position;
         a second window fluidically connecting the return port and the second actuator port when the pilot valve is in the first position;
         a third window fluidically connecting the supply port and the second actuator port when the pilot valve is in a second position; and
         a fourth window fluidically connecting the return port and the second actuator port when the pilot valve is in the second position;
      a control chamber within the pilot valve housing;
      a spring chamber within the pilot valve housing, wherein the valve block is between the control chamber and the spring chamber, and wherein the spring chamber is fluidically connected directly to the return pressure source; and
      a spring within the spring chamber;
   a selector valve comprising:
      a selector valve housing:
      a first port;
      a second port; and
      a third port fluidically connected to the control chamber of the pilot valve;
      a primary chamber within the selector valve housing;
      a secondary chamber within the selector valve housing;
      a selector valve block within the selector valve housing and between the primary chamber and the secondary chamber; and
      a second spring within the primary chamber;
   a primary solenoid valve comprising:
      a first port fluidically connected to the supply pressure source;
      a second port fluidically connected to both the first port of the selector valve and to the primary chamber of the selector valve; and
      a third port fluidically connected to the return pressure source; and
   a secondary solenoid valve, wherein the secondary solenoid valve comprises:
      a first port fluidically connected to the supply pressure source;
      a second port fluidically connected to both the second port of the selector valve and to the secondary chamber of the selector valve; and
      a third port fluidically connected to return pressure source.

2. The system of claim 1, wherein the primary solenoid valve further comprises:
   a first mode, wherein the primary solenoid valve fluidically connects the first port of the primary solenoid valve and the second port of the primary solenoid valve in the first mode; and
   a second mode, wherein the primary solenoid valve fluidically connects the second port of the primary solenoid valve and the third port of the primary solenoid valve in the second mode; and
   wherein the second mode of the primary solenoid valve is a fail-safe position of the primary solenoid valve.

3. The system of claim 1, wherein the spring within the spring chamber biases the valve block of the pilot valve in the second position.

4. The system of claim 3, wherein the first mode the primary solenoid valve fluidically connects the supply pressure source and the control chamber of the pilot valve to move the valve block of the pilot valve into the first position, and wherein when in the second mode the primary solenoid valve fluidically connects the return pressure source and the control chamber of the pilot valve to move the valve block of the pilot valve into the second position.

5. The system of claim 1, wherein the secondary solenoid valve further comprises:
   a first mode, wherein the secondary solenoid valve fluidically connects the first port of the secondary solenoid valve and the second port of the secondary solenoid valve when in the first mode of the secondary solenoid valve; and
   a second mode, wherein the secondary solenoid valve fluidically connects the second port of the secondary solenoid valve and the third port of the secondary solenoid valve when in the second mode of the secondary solenoid valve.

6. The system of claim 5, wherein the selector valve block comprises:
   a first passage;
   a second passage;
   a primary position within the selector valve housing; and
   a secondary position within the selector valve housing,
   wherein, in the primary position of the selector valve block, the first passage fluidically connects the second port of the primary solenoid valve to the third port of the selector valve and to the control chamber of the pilot valve and the secondary solenoid valve is fluidically shut-off to the control chamber of the pilot valve, and
   wherein, in the secondary position of the selector valve block, the second passage fluidically connects the second port of the secondary solenoid valve to the third port of the selector valve and to the control chamber of the pilot valve and the primary solenoid valve is fluidically shut-off to the control chamber of the pilot valve.

7. The system of claim 6, wherein the second port of the primary solenoid valve is fluidically connected to the primary chamber of the selector valve via a primary control line, wherein, in the first mode of the primary solenoid valve, the primary solenoid valve fluidically connects the primary chamber of the selector valve to the supply pressure source to maintain the valve block of the selector valve in the primary position and fluidically connect the control chamber of the pilot valve to the supply pressure source to put the pilot valve into the first position, and wherein, in the second mode of the primary solenoid valve, the primary solenoid valve fluidically connects the control chamber of the pilot valve, the primary control line, and the primary chamber to the return pressure source, the second spring biases and maintains the selector valve block in the primary position, and the pilot valve moves to the second position of the pilot valve.

8. The system of claim 6, wherein the second port of the secondary solenoid valve is fluidically connected to the secondary chamber of the selector valve via a secondary control line, wherein, in the first mode of the secondary solenoid valve, the secondary solenoid valve fluidically connects the secondary chamber of the selector valve to the supply pressure source to put the selector valve block in the secondary position and fluidically connect the supply pressure source to the control chamber of the pilot valve and move the pilot valve into the first position, and wherein, in the second mode of the secondary solenoid valve, the secondary solenoid valve fluidically connects the secondary chamber of the selector valve to the return pressure source to depressurize the secondary chamber and move the selector valve block back to the first position of the selector valve to move the pilot valve into the second position of the pilot valve.

9. A method of controlling an actuator, wherein the method comprises:
switching a primary solenoid valve to a first mode to fluidically connect a supply pressure source to a primary chamber of a selector valve and a first port of the selector valve, and wherein a selector valve spring is in the primary chamber of the selector valve and biases the selector valve to a primary position that fluidically connects the first port of the selector valve to a third port of the selector valve;
directing a fluid from the supply pressure source through the primary solenoid valve, and through the first port of the selector valve and the third port of the selector valve to fill a control chamber of a pilot valve and compress a spring within a spring chamber of the pilot valve to put the pilot valve in a first position, wherein the spring chamber is connected directly to a return pressure source that is lower in pressure than the supply pressure source, wherein the pilot valve in the first position fluidically connects the supply pressure source to a first chamber of the actuator and fluidically connects a second chamber of the actuator to the return pressure source, and wherein the actuator comprises a cylinder between the first chamber and the second chamber and a rod attached to the cylinder;
directing the fluid from the supply pressure source into the first chamber of the actuator to move the cylinder and the rod in a first direction while the pilot valve is in the first position;
switching the primary solenoid valve to a second mode to fluidically disconnect the first port of the selector valve from the supply pressure source and to fluidically connect the first port of the selector valve to the return pressure source with the control chamber of the pilot valve;
expanding the spring within the spring chamber of the pilot valve to evacuate the fluid in the control chamber to the return pressure source via the third port of the selector valve, via the first port of the selector valve, and via the primary solenoid valve and to put the pilot valve in a second position that fluidically connects the supply pressure source to the second chamber of the actuator and fluidically connects the first chamber of the actuator to the return pressure source; and
directing the fluid from the supply pressure source into the second chamber of the actuator and evacuating the fluid in the first chamber to the return pressure source to move the cylinder and the rod in a second direction while the pilot valve is in the second position.

10. The method of claim 9 further comprising:
defaulting the primary solenoid valve to the second mode of the primary solenoid valve upon failure of the primary solenoid valve;
switching a secondary solenoid valve to a first mode of the secondary solenoid valve to fluidically connect the supply pressure source to both a second port of the selector valve and to a secondary chamber of the selector valve;
directing the fluid from the supply pressure source through the secondary solenoid valve and into the secondary chamber of the selector valve to move the selector valve into a secondary position that fluidically connects the second port of the selector valve with the third port of the selector;
directing the fluid through both the second port of the selector valve and the third port of the selector valve to the control chamber of the pilot valve;
filling the control chamber of the pilot valve to put the pilot valve in the first position that fluidically connects the supply pressure source to the first chamber of the actuator and fluidically connects the second chamber of the actuator to the return pressure source; and
directing the fluid from the supply pressure source into the first chamber of the actuator to move the cylinder and the rod in the first direction while the pilot valve is in the first position.

11. The method of claim 10 further comprising:
switching the secondary solenoid valve to a second mode of the secondary solenoid valve to fluidically disconnect the second port of the selector valve from the supply pressure source and to fluidically connect the second port of the selector valve to the return pressure source;
urging the selector valve into the primary position by the selector valve spring in the primary chamber of the selector valve to fluidically connect the third port of the selector valve and the control chamber of the pilot valve with the return pressure source via the primary solenoid valve;
evacuating the fluid in the control chamber to the return pressure source via the third port of the selector valve, via the first port of the selector valve, and via the primary solenoid valve to put the pilot valve in the second position that fluidically connects the supply pressure source to the second chamber of the actuator and fluidically connects the first chamber of the actuator to the return pressure source; and directing the fluid from the supply pressure source into the second chamber of the actuator and evacuating the fluid in the first chamber to the return pressure source to move the cylinder and the rod in the second direction while the pilot valve is in the second position.

* * * * *